Figure 1:
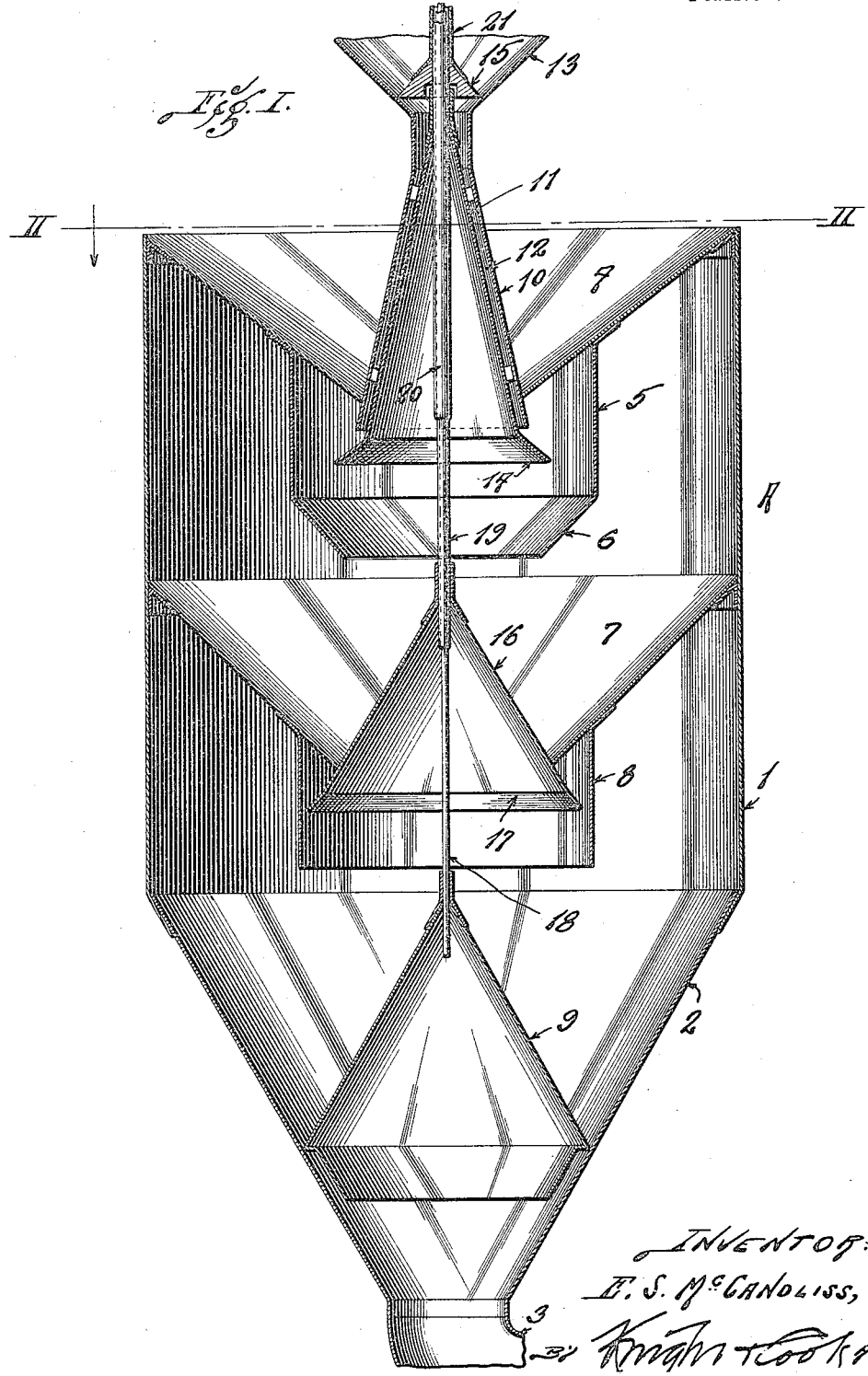

E. S. McCANDLISS.
CONCRETE MIXER.
APPLICATION FILED SEPT. 30, 1916.

1,224,656.

Patented May 1, 1917.
2 SHEETS—SHEET 1.

INVENTOR:—
E. S. McCANDLISS,
By Knight Cook attys.

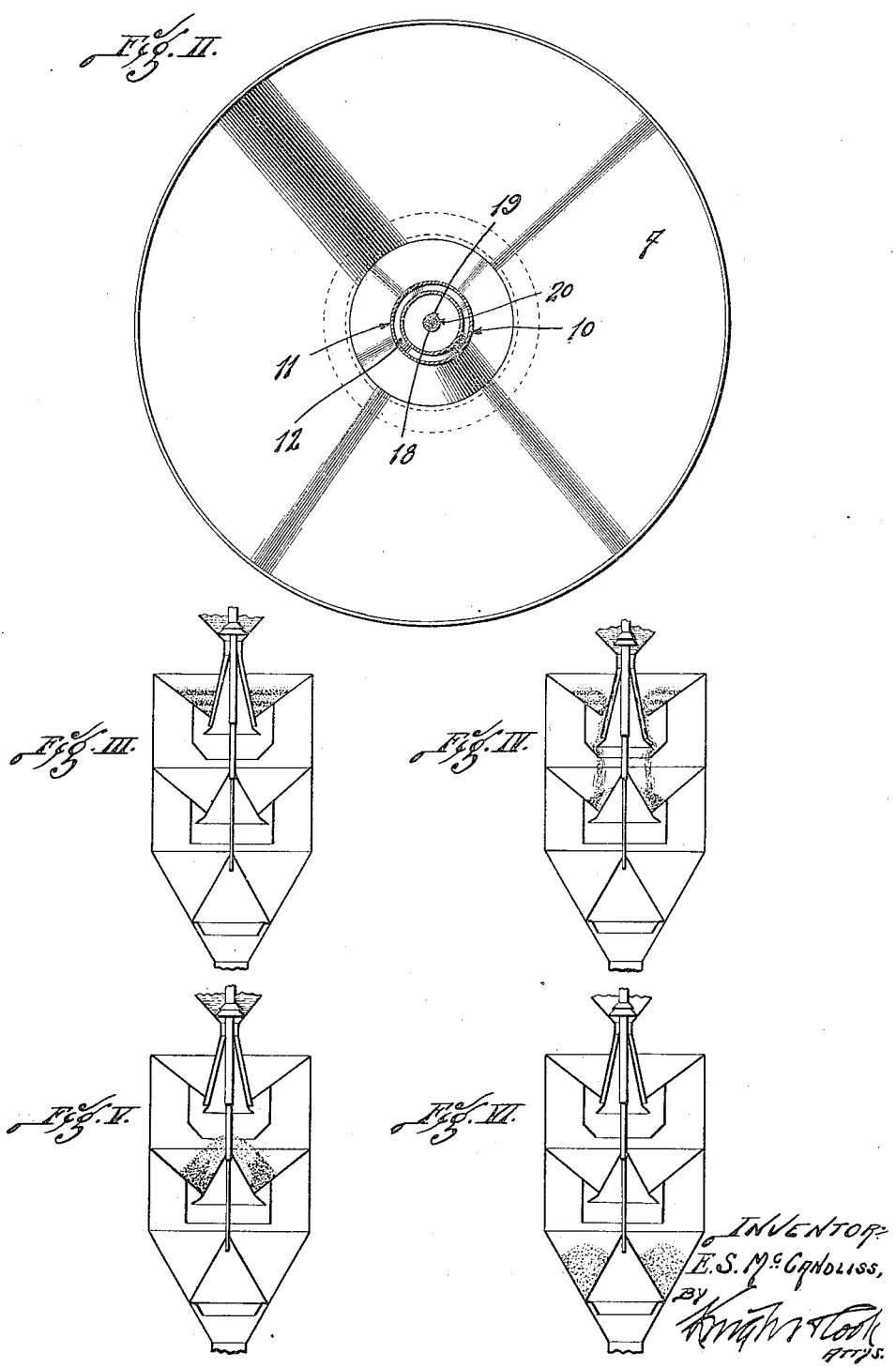

UNITED STATES PATENT OFFICE.

EDGAR S. McCANDLISS, OF ROLLA, MISSOURI.

CONCRETE-MIXER.

1,224,656.   Specification of Letters Patent.   Patented May 1, 1917.

Application filed September 30, 1916. Serial No. 123,002.

*To all whom it may concern:*

Be it known that I, EDGAR S. McCANDLISS, a citizen of the United States of America and a resident of Rolla, in the county of Phelps and State of Missouri, have invented certain new and useful Improvements in Concrete-Mixers, of which the following is a full, clear, and exact description, reference being had to the accompanying drawings, forming a part of this specification.

My invention relates to an apparatus for mixing concrete, and it has for its object to produce an apparatus of this kind which makes use of gravity for the mixing operation, and is so constructed as to provide for the ingredients of the concrete being thoroughly commingled without such agitation as to create detrimental aeration, and with the result of thoroughly coating the gravel, sand or other material with cement and avoiding the porosity found in concrete which is greatly agitated during mixing operations.

Figure I is a vertical section through my concrete mixer.

Fig. II is a top or plan view of the mixer with the upper central portions shown in horizontal section taken on line II—II, Fig. I.

Figs. III to VI inclusive are diagrams illustrating the operation of my mixer.

In the drawings, A designates the shell of my concrete mixer providing an upper mixing chamber 1, and a lower conical receiver 2, the latter terminating in a discharge spout 3.

4 designates a frustro-conical upper hopper mounted at the upper end of the shell A and extending downwardly thereinto. Beneath the upper hopper, and preferably supported thereby, is a baffle having a cylindrical wall 5 which surrounds the discharge opening of the upper hopper and terminates at its lower end in an inwardly inclined annular deflector 6 against which the material discharged from the upper hopper 4 may move and be directed toward the vertical axis of the shell A, as will hereinafter fully appear.

7 designates a frustro-conical second or lower hopper supported within the shell A beneath the upper hopper 4. This second or lower hopper is also of frustro-conical form and has a discharge opening at its lower end normally closed by a valve to be described. Beneath the lower hopper 7 and preferably depending therefrom is a cylindrical vertical baffle 8 against the inner wall of which the material discharged from the lower hopper 7 is directed as it descends upon the lower hopper into the receiver 2 at the lower end of the shell A.

The conical receiver 2 is normally closed by a conical valve 9. At the upper end of my concrete mixer I provide ingredient delivery means, which, in the construction illustrated, has associated therewith means for delivering cement in solution at a point beneath the upper hopper 4, in order that the cement in solution may be mixed with the gravel, sand or other ingredients of concrete placed in said upper hopper while they are descending therefrom to the lower hopper 7. 10 designates a tapering valve extending vertically through the upper hopper 4, this valve being of the greatest diameter at its lower end and serving to close the outlet at the bottom of said upper hopper.

Within and concentric with the tapering valve 10 is a cone 11 which is secured to said valve and spaced therefrom, furnishing an annular passageway 12 which leads downwardly from a top receptacle 13 at the upper end of the valve 10 in which cement in solution may be contained to be delivered through said passageway and flow therefrom onto an annular deflector 14 at the lower end of the cone 11. This deflector is in such position beneath the upper hopper that it will not only receive the liquid cement descending thereonto but will also receive the material discharging from the upper hopper 4 and deflect it therefrom onto the inwardly extending baffle deflector 6, during which time the material discharged from the upper hopper becomes coated with the liquid cement. 15 is a valve for controlling the discharge of liquid cement from the top receptacle 13.

16 designates a closure or valve, preferably in the form of a cone as shown, which serves to close the lower hopper 7, this closure or valve extending through the outlet of the lower hopper 7 and being of greatest diameter at its lower end. Said closure or valve terminates beneath said lower hopper in an outwardly flaring annular deflector 17 which serves to direct the material discharged from the lower hopper 7 against the inner wall of the lower baffle 8.

Any suitable means for operating the closures or valves herein mentioned may be provided but I preferably use the means illustrated comprising the following: A rod 18 is connected to the lower valve 9 and extends vertically through the apparatus. An inner sleeve 19 attached to the valve 16 is telescopically fitted to the rod 18 and extends to the top of the apparatus. An outer sleeve 20 telescopically fitted to the inner sleeve 19 is secured to the cone 11 and as this cone is conjoined to the tapering closure or valve 10 said outer sleeve serves as a means for lowering and elevating both of said parts. A sleeve 21 telescopically fitted to the outer sleeve 20 is attached to the conical closure or valve 15. Each of these valve operating members may be moved vertically relative to the other valve operating members, and, therefore, the valves to which they are connected may be adjusted at the will of the operator, and it will be apparent that any suitable means may be provided for holding the valve operating members in positions to which they are adjusted.

In the practical use of my concrete mixer, sand and gravel, or other material with which cement and water are to be mixed to produce concrete, are deposited in the upper hopper 4, and cement in solution, produced by mixing hydraulic cement and water, is placed in the top receptacle 13, the valves in said upper hopper and top receptacle being closed at the time of filling said upper hopper and top receptacle. The tapering valve 10 is then lowered to provide an annular passageway between it and the lower end of the upper hopper 4 through which the contents of said upper hopper may escape, and the valve 15 is opened slightly to permit escape of cement in solution from the top receptacle 13 through the passageway 12 to mingle with the material descending from the upper hopper 4. As the descending material strikes the deflector 14 at the lower end of the cone 11 it is deflected outwardly and falls onto the inwardly inclined deflector 6 which serves to carry it inwardly toward the vertical axis of the mixer as illustrated in Fig. IV. As a consequence, the falling material moves in its descent toward the downwardly inclined wall of the conical valve 16 against which the first descending material strikes, and, as the fall continues, the material becomes banked partly against said conical valve and partly against the opposing inclined lower hopper 7. During this deposit of the material passing from the upper hopper 4 to the lower hopper 7 the finer material has a tendency to settle adjacent to the conical valve 16 and the body of this finer material becomes more or less surrounded by the coarser material. This is due to the fact that the finer material settles more readily at its point of impact than the coarser material, the latter having more of a tendency to bound away from the point of impact and more outwardly therefrom. The deposit produced in the lower hopper 7, therefore, becomes, more or less, a stratified one, such as is seen in Fig. V, the finer material being at least in a large measure centrally located relative to the coarser material.

The next step in the operation is the opening of the valve 16 to permit the escape of the material from the lower hopper 7 and its deposit in the conical receiver 2. Upon the opening of said valve 16 the material in said lower hopper moves downwardly between the wall of the hopper and the wall of the valve, passing onto the deflector 17 and striking against the vertical inner wall of the lower baffle 8. The said lower baffle is located substantially in vertical alinement with the bottom of the tapering pocket in the receiver 2 surrounding the conical valve 9, and, therefore, when the material leaves said lower baffle it falls in approximately a vertical course toward the bottom of said tapering pocket.

Reverting now to consideration of the stratification of fine and coarse material produced in the lower hopper 7. By reason of such stratification, in which the two bodies of material lie upon opposing inclined planes, namely, those of the lower hopper 7 and conical valve 16, they move simultaneously downward toward the outlet between the lower hopper and the valve, resulting in the coarse and fine material becoming thoroughly intermingled while they are passing through said outlet onto the deflector 17 of the conical valve 16 and against the vertical lower baffle 8. Owing to said lower baffle being disposed, as previously mentioned, above the bottom of the pocket in the receiver 2 the well mixed material descends into said pocket and settles therein, partly against the wall of the receiver 2 and partly against the valve 9. The thorough mixture of the material is preserved when the material is discharged through the spout 3 leading from the receiver.

The conical valves in the hoppers of my mixer preferably have a steeper pitch than the walls of the hoppers, the object of this being to cause the material in the hoppers to break down adjacent to the valve or the centers of the hoppers while escaping through the hopper discharge openings. The valve 9 in the receiver 2 is preferably of the same pitch as the wall of said receiver.

It will be understood that the hoppers 4 and 7 respectively with the valves 10 and 16 respectively therein, and the receiver 2 with the valve 9 therein, constitute receptacles having inclined walls and having bottom outlets.

It will be further understood that the deflector beneath the upper hopper serves to direct the material falling from the said upper hopper in such manner as to cause the said material to strike one of the inclined walls of the lower hopper beneath it with the result of tending to cause stratification of the fine and coarse material as described.

It will be further understood that the deflector beneath the second or lower hopper serves to direct the material falling from said second or lower hopper in such a manner as to cause the said material to be mixed and deposited within the receiver 2 in substantially the manner described.

I claim:—

1. A mixer comprising an upper hopper having a bottom outlet, a lower hopper beneath the upper hopper, having a bottom outlet, an inclined closure adapted to close the bottom outlet of said lower hopper, a receiver beneath the lower hopper, means beneath the upper hopper for deflecting material discharged therefrom against the inclined closure, and means beneath the lower hopper for causing the material discharged from the lower hopper to be deposited substantially vertically into the receiver.

2. A mixer comprising an upper hopper having a bottom outlet, a lower hopper beneath the upper hopper, having a bottom outlet, a conical closure adapted to close the bottom outlet of said lower hopper, a receiver beneath the lower hopper, means beneath the upper hopper for deflecting material discharged therefrom against the conical closure, and means beneath the lower hopper for causing the material discharged from the lower hopper to be deposited substantially vertically into the receiver.

3. A mixer comprising an upper hopper having a bottom outlet, a lower hopper beneath the upper hopper, having a bottom outlet, a conical closure adapted to close the bottom outlet of said lower hopper, and forming an inwardly inclined wall extending upwardly into said lower hopper, a receiver beneath the lower hopper, a depending baffle beneath the upper hopper having an inwardly extending lower portion for deflecting material discharged therefrom inwardly against the conical closure, and means beneath the lower hopper for causing the material discharged from the lower hopper to be deposited substantially vertically into the receiver.

4. A mixer comprising an upper hopper having a bottom outlet, a lower hopper beneath the upper hopper, having a bottom outlet, a conical closure adapted to close the bottom outlet of said lower hopper, and forming an inwardly inclined wall extending upwardly into said lower hopper, a receiver beneath the lower hopper, means beneath the upper hopper for deflecting material against the conical closure, means beneath the upper hopper and encircled by the deflecting means, for deflecting material discharged from the upper hopper bottom outlet against the deflecting means, and means beneath the lower hopper for causing the material discharged from the lower hopper to be deposited substantially vertically into the receiver.

5. A mixer comprising an upper hopper having a bottom outlet, a lower hopper beneath the upper hopper, having a bottom outlet, a conical closure adapted to close the bottom outlet of said lower hopper, and forming an inwardly inclined wall extending upwardly into said lower hopper, an outwardly flaring tapering closure for the upper hopper, adapted to deflect material discharged therefrom outwardly, a depending baffle encircling the outwardly flaring closure and adapted to limit the outward movement of the deflected material and deflect it inwardly against the conical closure, a receiver beneath the lower hopper, and means whereby the material discharged from the lower hopper is caused to be deposited into the receiver.

6. A mixer comprising an upper hopper having a bottom outlet, a lower hopper beneath the upper hopper, having a bottom outlet, a conical closure adapted to close the bottom outlet of said lower hopper, and providing an inclined wall within said lower hopper, an outwardly flaring tapering closure for the upper hopper, having a double-walled portion adapted to the conveyance of material therethrough and having a discharge opening, means beneath the upper hopper for deflecting material discharged therefrom against the conical closure, a receiver, and means beneath the lower hopper for causing the material discharged from the lower hopper to be deposited into said receiver.

7. A mixer comprising an upper hopper having a bottom outlet, a lower hopper beneath the upper hopper, having a bottom outlet, a conical closure adapted to close the bottom outlet of said lower hopper, and providing an inclined wall within said lower hopper, a tapering closure for the upper hopper, having an outwardly flaring portion for deflecting material outwardly, and a double-walled portion adapted to the conveyance of material therethrough, and having a discharge opening adjacent the flaring portion, means beneath the upper hopper for limiting the outward movement of deflected material and deflecting material against the inclined wall of the conical closure, a receiver and means beneath the lower hopper for causing the material discharged from the lower hopper to be deposited into said receiver.

8. A mixer comprising an upper hopper having a bottom outlet, a lower hopper beneath the upper hopper, having an inclined wall and a bottom outlet, a conical closure extending upwardly into said lower hopper adapted to close the bottom outlet of said lower hopper and deflect material outwardly toward the wall of said hopper, means between the hoppers for directing material discharged from the upper hopper toward said conical closure, a receiver beneath the lower hopper, and a depending baffle beneath the lower hopper to limit the outward movement of material deflected by the conical closure and deflect it substantially vertically into the receiver.

9. A mixer comprising an upper hopper, having a bottom outlet, a closure for said outlet, a lower hopper having a bottom outlet, a conical closure for the outlet of said lower hopper adapted to deflect material outwardly within said lower hopper, a receiver beneath the lower hopper having an inclined wall, a conical closure for the receiver, and means whereby material discharged from the lower hopper and deflected outwardly by its closure is limited in its outward movement and delivered substantially vertically into the receiver, approximately in vertical alinement with the meeting portions of the inclined walls.

10. A mixer comprising an upper hopper, having a bottom outlet, a closure for the outlet, a lower hopper having a bottom outlet, a conical closure for the outlet of said lower hopper adapted to deflect material outwardly within said lower hopper, a receiver beneath the lower hopper having an inclined wall, a conical closure for the receiver, and a depending baffle beneath the lower hopper and encircling the conical closure of the lower hopper and adapted to deflect material, deflected by the conical closure of the lower hopper, vertically into the receiver approximately in alinement with the meeting portions of the inclined walls.

11. A mixer comprising an upper hopper having a bottom outlet, and a bottom outlet closure having a double wall forming a space adapted to serve as a passage for a fluid delivered into material passed from said upper hopper.

12. In a mixer of the character described, a frustro-conical upper hopper, a conical valve controlling the outlet of said hopper, an inner conical lining in said conical valve, a vent between said inner conical lining of said conical valve and said conical valve, a second frustro-conical hopper beneath said upper frustro-conical hopper, a conical valve controlling the outlet of said second frustro-conical hopper, means for deflecting the material discharged from the said upper frustro-conical hopper toward the conical valve controlling the outlet of said second frustro-conical hopper, a conical receiver beneath said second frustro-conical hopper, a conical valve controlling the outlet of said receiver, means beneath said second frustro-conical hopper for deflecting the material discharged from the said second frustro-conical hopper toward the region between the said receiver and the said conical valve controlling the outlet of said receiver.

EDGAR S. McCANDLISS.

Copies of this patent may be obtained for five cents each, by addressing the "Commissioner of Patents, Washington, D. C."